United States Patent [19]

De Keyser et al.

[11] Patent Number: 4,806,159

[45] Date of Patent: Feb. 21, 1989

[54] ELECTRO-NICKEL PLATING ACTIVATOR COMPOSITION, A METHOD FOR USING AND A CAPACITOR MADE THEREWITH

[75] Inventors: Andre De Keyser, Wichita Falls, Tex.; Luc Naessens, Nazareth; Eddy Vincent, Lokeren, both of Belgium

[73] Assignee: Sprague Electric Company, North Adams, Mass.

[21] Appl. No.: 74,104

[22] Filed: Jul. 16, 1987

[51] Int. Cl.⁴ .............................................. C23C 18/28
[52] U.S. Cl. .................................. 106/111; 427/304; 427/305
[58] Field of Search ............... 106/1.11; 427/304, 305; 430/413, 417, 153

[56] References Cited

U.S. PATENT DOCUMENTS

| | | | |
|---|---|---|---|
| 2,690,402 | 9/1954 | Crehan | 117/47 |
| 3,035,944 | 5/1962 | Sher et al. | 117/213 |
| 3,135,046 | 6/1964 | Stookey | 29/424 |
| 3,867,174 | 2/1975 | Maekawa et al. | 106/1.11 |
| 4,425,378 | 1/1984 | Maher | 427/79 |
| 4,622,069 | 11/1986 | Akai et al. | 106/1.11 |
| 4,734,299 | 3/1988 | Matuzaki et al. | 106/1.11 |

FOREIGN PATENT DOCUMENTS 0183399  6/1986  European Pat. Off. .

*Primary Examiner*—Paul Lieberman
*Assistant Examiner*—Helene Kirschner

[57] ABSTRACT

A plating activator composition that is largely silver is applied in a thin film to two surface areas of a ceramic chip capacitor. Subsequently, many such chip capacitors are electrolytically nickel plated, e.g. are electro-nickel barrel plated to provide two strongly adhered nickel terminals to the component. This activator composition consists essentially of at elast 85% Ag, from 0.1 to 7% Pd, from 1% to 10% of an element selected from Cu, Si, Bi, Zn, Fe, Ni, Sn, Zr, Nb, Sb, Mn and combinations thereof. These terminals are strong, truly conformal and are highly manufacturable.

7 Claims, 1 Drawing Sheet

ELECTRO-NICKEL PLATING ACTIVATOR COMPOSITION, A METHOD FOR USING AND A CAPACITOR MADE THEREWITH

BACKGROUND OF THE INVENTION

This invention relates to a plating activator for electrolytic nickel plating (hereinafter designated as electro-nickel plating) on a ceramic body, and more particularly, pertains to such an activator containing a high percentage of silver.

The activation of a nonconductive surface for electroless plating nickel has traditionally been accomplished by depositing a thin layer of palladium, e.g. as described in U.S. Pat. No. 2,690,402 issued Sept. 28, 1954. Improvement in the quality and adherence of nickel plating on a ceramic body was achieved by the addition to palladium in the activator of silicon and zinc in the patent to John P. Maher, U.S. Pat. No. 4,425,378 issued Jan. 10, 1984 and assigned to the same assignee as the present invention. In one limiting example (Example 22) of the Maher patent the palladium makes up a little more than 5 weight percent of these ingredients and at the other end of the workable spectrum (Example 13) palladium amounts to 37 percent of these three ingredients.

The substantial quantities of palladium used in such activators makes the expense of the activator a significant percentage of the total cost of electroless plating.

Silver has been used as a thin activator layer on a ceramic body deposited in preparation for plating copper, and then silver, e.g. for use as a mirror. However, the adherence of a nickel plate over a silver activator is inadequate for terminals on a ceramic chip component which terminals are not only the means by which electrical access is had to the component but are also the means by which the component is physically mounted.

Nickel electro-plating of a ceramic body is also accomplished by first applying a coating of a paste containing silver powder and an acid resistant glass frit, and firing this coating. Such cermet pastes are applied relatively thickly, contain a great deal of silver per square area covered, and are not entirely conformal with the ceramic body so that overall dimensions are difficult to control. Of course, other relatively noble metals, such as palladium, could be substituted for the silver in an electro-plating activator composition but with no known advantage; the cost of palladium being more than 50 times greater than that of silver, such substitution has been contraindicated.

It is an object of the present invention to provide an improved electro-nickel plating activator composition capable of being effective as a thin film in the preparation for the electro-plating of nickel on a ceramic body that provides high plating quality and strong adherence while having a low cost.

SUMMARY OF THE INVENTION

An electro-plating activator composition consists essentially of by weight the ingredients at least 85% silver, from 0.1% to 7% palladium and from 1% to 10% of an element selected from copper, silicon, bismuth, zinc, iron, nickel, tin, zirconium, niobium, antimony, manganese and combinations thereof.

This activator is used in a method for making an electrical ceramic component. The component may be a ceramic chip carrying a thin film resistor, a monolithic ceramic chip capacitor having buried electrodes extending to opposite faces of the chip or a multi metal layer wiring and component board built in a ceramic body.

A thin film of the activator is selectively deposited on the ceramic body or chip in at least two separate areas at which terminals are to be formed. The film is heated to a peak temperature from 500° C. to 850° C. and subsequently, many such activated chips are subjected to a conventional barrel electro-plating operation to selectively plate a layer of nickel just over the activator treated areas. By this process, conformal and strongly bonded nickel electro-plated terminals are formed on the ceramic.

This invention recognizes that small amounts of palladium added to the dominantly-silver activator composition provide superior adhesion of electro-nickel terminations. It has long been understood that palladium additions to electroless-plating activators was essential because of its catalytic action by which the chemical electroless-deposition was made possible. There is no such role for a catalyst in an electrolytic plating process thus, this advantage of palladium in the electroplating process of this invention is surprising and we do not yet know the mechanism by which its presence is advantageous to electroplating.

DESCRIPTION OF THE PREFERRED EMBODIMENTS

A number of experimental activator compositions were made in paste form and each paste was deposited in a thin layer over surface portions of a substrate of barium titanate, or other ceramic substrate as noted. The basic elements of each activator composition are shown in the Tables 1 and 2 below for each experimental example. The activator-coated body was then heated to 150° C. for 15 minutes to drive out the organic vehicle in the paste and then fired at a peak temperature of 550° C. for 4 minutes to burn off the remaining organic paste materials. By this process it was hoped to leave the basic elements or their oxides bonded to each other and to the ceramic by what is supposed to be a superficial reaction of those elements with each other and with the substrate.

Figure 1:
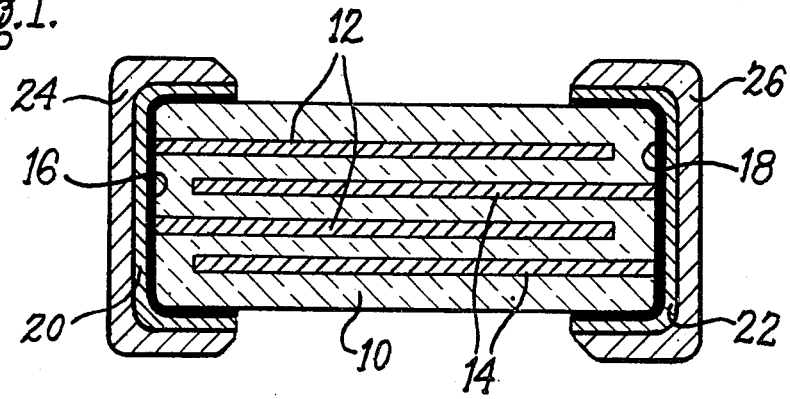
FIG. 1 shows in cross sectional view a multilayer ceramic capacitor having nickel electro-plated electrodes over a film of the predominantly silver activator of this invention.
Figure 2:
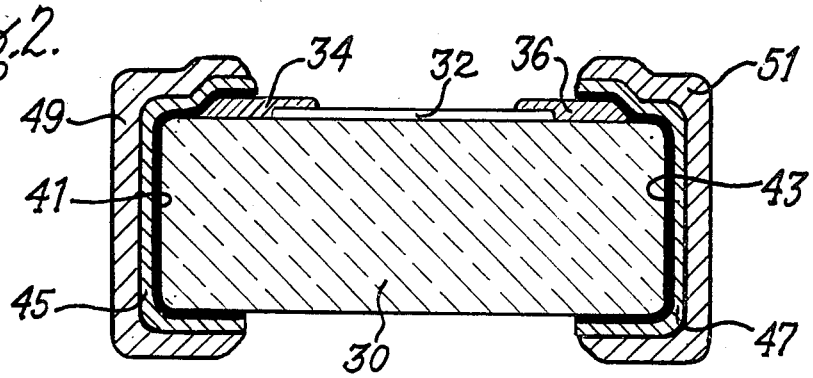
FIG. 2 shows in side sectional view a "chip" resistor having electro-plated nickel electrodes over a film of an activator of this invention.

These experiments were specifically aimed at making electro-nickel plated terminations on monolithic ceramic capacitors as is illustrated in FIG. 1 or on another ceramic chip component as illustrated in FIG. 2. For such use, a crucial measure of success is the degree of adhesion effected between the termination and the ceramic body.

A multilayer capacitor illustrated in FIG. 1 has a ceramic body 10 with two groups 12 and 14 of sheet electrodes interdigitated with each other and buried in body 10. The left and right surfaces (as shown) are coated with the activator films 16 and 18 contacting extended portions of electrodes 12 and 14, respectively.

The electro-plated nickel layers 20 and 22 conform to and adhere to the activator films 16 and 18, respectively. Solder layers 24 and 26 likewise conform and adhere to nickel layers 20 and 22, respectively. The nickel is deposited by the standard method of submersing the activated bodies in a nickel sulphamate electroplating bath at 50° C. and barrel-electroplating for 1 minute at 2A/dm$^2$ (2 amperes/square decimeters). Electro-plated nickel layers of about 2 microns result where activation is effective. The ceramic capacitor is then removed from the bath, thoroughly rinsed with demineralized water and acetone and finally dried.

Electro-nickel plated terminations may be advantageously applied to other ceramic chip components such as the chip resistor shown in FIG. 2. There a ceramic body 30 supports a resistor film 32 contacting at the distal ends thereof interim termination films 34 and 36. The ends of body 30 have terminals consisting of plating activator layers 41 and 43, overlaid by electro-plated nickel layers 45 and 47 that are further covered by solder layers 49 and 51.

Electrical and mechanical connection is typically made to chip components by means of a lead wire that is attached to each chip termination. Thus a more direct measure of adhesion of the termination to the ceramic body of such a chip would be had by actually soldering (60Sn40Pb) tin-plated copper wires to the nickel plated chip terminations. This assembly is then aged for 48 hours at 150° C. By gripping the lead ends one at a time and pulling straight away from the substrate with increasing force, the force necessary to destroy the connection is determined and used as the measure of the adherence of the termination. This test of adhesion is referred herein as the pull test. This wire-lead pull method is employed for all the units representing the following additional experimental Examples 4 through 28.

Figure 3:
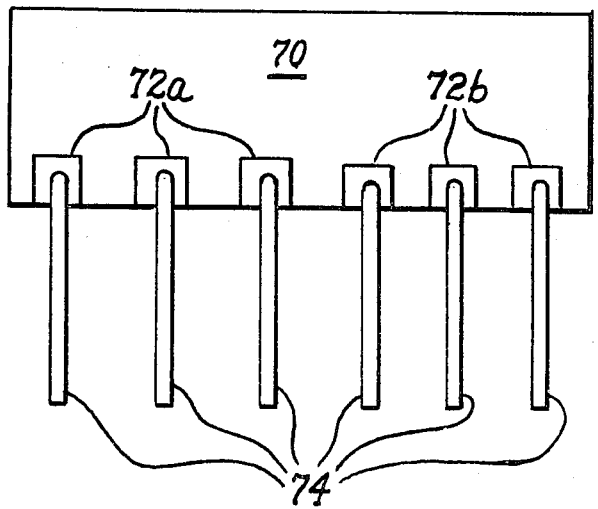
FIG. 3 shows in top view a termination-to-ceramic adhesion-test assembly.

The tests reported here were actually made by first applying six patches of activator to a major surface and near an edge of a barium titanate substrate 70 that is 1 mm thick, and electroplating nickel to selectively form six nickel chip-termination-like patches. Patches 72a are 4.5 mm×4.5 mm and the smaller patches 72b are 2.5 mm×2.5 mm. as illustrated in FIG. 3. Six tin-plated copper wires 74 having a diameter of 0.5 millimeter are soldered respectively to the six nickel terminations 72a and 72b. The wires are each orthogonally pulled from the substrate surface. The highest and lowest pull strengths are disregarded and an average of the remaining four pull strengths is obtained and entered in the Tables 1 and 2 as the measure of nickel patch (termination) to ceramic substrate adhesion. The reported results of this test are commensurate but not exactly correlatable to those obtained in the above-mentioned Maher patent wherein a pair of wires are orthogonally attached to a ceramic disc. It is estimated that these values correspond to about twice those as measured by the method employed in the above-noted patent to Maher.

TABLE 1

| Ex. # | Ag | Pd | Ba | Al | Si | Sb | Ti | Zr | Nb | Mn | Fe | Ni | Cu | Zn | Plating quality | Plating adhesion kg.* |
|---|---|---|---|---|---|---|---|---|---|---|---|---|---|---|---|---|
| 1 | 45.0 | | | | 22.0 | | | | | | | | | 33.0 | nil | — |
| 2 | 64.9 | | | | 13.8 | | | | | | | | | 21.4 | nil | — |
| 3 | 79.4 | | | | 8.0 | | | | | | | | | 12.6 | nil | — |
| 4 | 97.8 | 0.3 | | | 0.6 | | | | | | | | | 1.3 | Good | 2.90 |
| 5 | 97.1 | 0.3 | | | 0.9 | | | | | | | | | 1.7 | Exc. | 2.45 |
| 6 | 95.2 | 2.1 | | | | | | | | | | | 2.7 | | Exc. | 2.13 |
| 7 | 88.8 | 2.2 | | | | | | | | | | | 5.8 | 3.3 | Exc. | 2.83 |
| 8 | 93.4 | 2.0 | | | | | | 1.9 | | | | | 2.7 | | Exc. | 3.40 |
| 9 | 94.7 | 0.3 | | | | | | | | | | | 5 | | Exc. | 3.7 |
| 10 | 97.7 | 0.3 | | | | | | | | | | | 2 | | Exc. | 3.8 |
| 11 | 99.7 | 0.3 | | | | | | | | | | | | | Good | 0.0 |
| 12 | 92.9 | 0.4 | 4.3 | | 1.0 | | | | | | | | | 1.5 | Exc. | 1.90 |
| 13 | 93.2 | 0.4 | | 4.0 | 0.8 | | | | | | | | | 1.6 | Good/Exc. | 2.90 |
| 14 | 93.1 | 0.4 | | | 0.9 | | | | | | 4.0 | | | 1.6 | Good | 3.20 |
| 15 | 93.0 | 0.2 | | | 0.8 | | | | | | | 4.4 | | 1.6 | Good | 3.83 |
| 16 | 93.1 | 0.2 | | | 0.8 | | 4.3 | | | | | | | 1.6 | Good/Exc. | 3.63 |
| 17 | 93.0 | 0.2 | | | 0.8 | | | | 4.4 | | | | | 1.7 | Good/Exc. | 3.70 |
| 18 | 91.7 | 0.2 | | | 0.8 | 5.7 | | | | | | | | 1.6 | Outst. | 3.23 |
| 19 | 93.4 | 0.4 | | | 1.0 | | | | | 3.8 | | | | 1.5 | Good/Exc. | 3.40 |

*Adhesion was measured after ageing for 48 hours at 150° C.

TABLE 2

| Ex. # | Ag | Pd | Pt | Ru | Si | Sn | Bi | Ti | Cr | Cu | Zn | Plating quality | Plating adhesion kg.* |
|---|---|---|---|---|---|---|---|---|---|---|---|---|---|
| 20 | 91.5 | | | | | | 5.9 | | | 2.6 | | Good | 2.75 |
| 21 | 93.1 | | | | | | 5.7 | | 1.3 | | | nil | — |
| 22 | 90.3 | | | | | 3.1 | 6.6 | | | | | Good | 2.00 |
| 23 | 96.7 | | | | | 2.3 | | 1.0 | | | | nil | — |
| 24 | 94.4 | | | | | 2.3 | | | | | 3.3 | Exc. | 2.00 |
| 25 | 97.7 | | | | | 2.4 | | | | | | Good | 3.20 |
| 26 | 85.8 | 5.4 | 0.4 | | | 0.2 | 7.6 | | 0.6 | | | Exc. | 3.40 |
| 27 | 91.6 | 5.7 | 0.5 | | | 0.1 | 2.0 | | 0.2 | | | Exc. | 2.65 |
| 28 | 93.8 | 0.4 | | 3.5 | 0.8 | | | | | | 1.6 | Good/Exc. | 3.27 |

*Adhesion was measured after ageing for 48 hours at 150° C.

EXAMPLES 1, 2 and 3

In a first experiment an activator paste was prepared by thoroughly mixing 5.56 g of 24.6% silver resinate, 7.30 g of 13.7% zinc resinate and 7.15 g of 9.35 silicon resinate, all by weight. Viscosity was optimized by introducing into this paste a binder/vehicle system, made up of a 6% solution of N-50 ethylcellulose in pine-oil, the ethylcellulose having been supplied by Hercules Inc., Wilmington, Del. Terpineol can also be used as the vehicle system. The paste was finally three roll milled until a homogenous mixture was obtained. A film of this paste was evenly applied to the end surfaces of barium titanate chips. After drying and firing the activator films, the thickness of the activator films was from 0.1 to 0.5 micron. The chips were barrel "electroplated" by the above-described method. No nickel plating resulted and, of course, no adhesion tests were conducted.

The experimental units of Examples 2 and 3 are made by the same method as for those in Example 1 except increasing amounts of silver were employed. There was no plating.

It is apparent that for nickel electroplating, simply substituting the much lower cost silver for palladium in the activator composition of the Maher patent will not be effective.

EXAMPLES 4 and 5

The activators of these examples contain a very small fraction of palladium and a greater amount of silver than in Examples 1-3. Good to excellent plating quality resulted along with very good adherence as can be seen from the Table. For units of Example 4 the force measure of adhesion pull test is 2.90 kg. Adhesion as measured by the push test for barium titanate chip capacitors (e.g. 10) made with the activator of Example 4 is 5.07 kg whereas the push test applied to capacitors with conventional electro-plated nickel terminals on an intermediate prior art silver cermet coating typically results in a 5 kg adherence.

EXAMPLES 6, 7, 8, 9, 10

The activators of these examples contain a small amount of copper. All led to good results but the activators of Examples 9 and 10 offer high economy with superior adhesion. The further addition of titanium in the activator of Example 8 improved adhesion somewhat relative to the results in Example 6. However, in Examples 9 and 10 the activators have a reduced amount of palladium with only copper added, produce excellent plating and are especially non critical with respect to variations in activator compositions.

EXAMPLE 11

It is particularly noteworthy that the activator of Example 11 has the same ingredients as those of Examples 4 through 70 with the copper, zinc, silicon and titanium missing. Except for 0.3% palladium, the activator is pure silver. Good plating is achieved with it but having essentially no adhesion (i.e. less than 0.1 kg by the pull test). An adhesion rating of at least 2.0 kg by the pull test is needed for a metal terminal on an electrical ceramic component to meet a variety of commercial terminal strength requirements. The results in Examples 4 through 11 make it clear that the base-metal addition of copper only or zinc and silicon lead to acceptable terminal adhesion, but with no base-metal, there is no adhesion.

EXAMPLES 12, 13, 14, 15, 16, 17, 18 and 19

In each of these examples the activator compositions employ a large amount of silver with silicon and zinc plus another element. Only in the case of Example 12 did the additive, barium, have a degrading effect on adhesion with reference to the activators without barium in Examples 4 and 5. Furthermore, the aluminum addition in Example 13 could be seen as having a small beneficial effect with respect to plating quality but otherwise contributed nothing. Of greater interest was the significant improvement in plating adherence with each of the additions of iron, nickel, zirconium, niobium, antimony and manganese, respectively, in Examples 14 through 19.

EXAMPLES 20, 21, 22, 23, 24 and 25

Precious metals, such as palladium, platinum and ruthenium are missing from the activator compositions of these examples and further additions of copper, bismuth, tin titanium and zinc are made. In Examples 20 and 21 copper and bismuth additions produce an acceptable activator and an unacceptable activator, respectively.

The combination in Example 22 of additives of tin and bismuth, and additives of tin with zinc in Example 24 leads to good terminal plating, whereas tin and titanium in Example 23 was a failure. Adding only tin to the silver as in Example 25 surprisingly produces a good quality plating having quite a good adhesion. All of these additives except titanium were seen to have been responsible for some improvement in plating in this series of six experiments.

However, these compositions without any of the precious metals are clearly more sensitive to changes in the additive amounts of the base metals, and activator compositions with at least 0.1 weight percent palladium are preferred as being less critical and more reliable for use in manufacturing.

EXAMPLES 26, 27 and 28

The activators of these examples include various amounts of a combination of precious metals, e.g. up to 6.2 weight percent, along with several additives, all producing good plating results.

In other experiments a few of the above-described activator compositions have been used for providing electro-plated nickel terminations to ceramic substrates other than barium titanate. The activator films after baking were from 0.5 to 1.0 micron thick. There has been observed no significant change in the relative qualities and adhesions of these terminations to neodymium titanate and to lead lanthanum zirconate titanate substrates.

However, as indicated in Table 3, using the activators of Examples 4, 7, 8, 9, 10, 11, 20, 25 and 26 to terminate alumina substrates, poor results were obtained when the activator firing was at 550° C. But at an 800° C. firing these same activators are more effective. Even so their adhesions range from 1.3 to 2.7 or fair to good.

TABLE 3

| Ex. # | Firing 550° C. | | Firing 800° C. | |
|---|---|---|---|---|
| | Plating quality | Adhesion* (kg) | Plating quality | Adhesion* (kg) |
| 4 | fair | 0.70 | nil | — |
| 7 | good | 0.60 | nil | — |
| 8 | good | 0.70 | good | 2.20 |
| 20 | fair | 0.90 | good | 2.70 |
| 25 | good | 1.20 | good | 1.30 |
| 26 | good | 0.90 | good | 1.40 |
| 11 | good | 0.70 | good | 1.60 |
| 10 | good | 1.10 | good | 2.30 |

TABLE 3-continued

| | Firing 550° C. | | Firing 800° C. | |
|---|---|---|---|---|
| Ex. # | Plating quality | Adhesion* (kg) | Plating quality | Adhesion* (kg) |
| 9 | good | 1.20 | good | 2.20 |

*Adhesion was measured after ageing for 48 hours at 150° C.

Nevertheless, these high silver activators provide adhesion of electro-plated nickel to any ceramic including alumina that is useful in the electronic component art and is superior to high-silver containing activators of the prior art.

What is claimed is:

1. An electro-plating activator composition, for sensitizing a ceramic surface to be electro-plated with nickel, consisting essentially of the ingredients at least 85% silver, from 0.1% to 7% of the precious metal palladium and from 1% to 10% of an element selected from copper, silicon, bismuth, zinc, iron, nickel, tin, zirconium, niobium, antimony, manganese, and combinations thereof wherein said percentage quantities, are by weight relative to that of the sum of said ingredients.

2. The electro-plating activator of claim 1 wherein said palladium amounts to from 0.2 to 2.5 weight percent of said silver.

3. The electro-plating activator of claim 2 wherein said selected elements are comprised of copper amounting to from 1.5 to 5.5 weight percent of said ingredients.

4. The electro-plating activator of claim 1 wherein said palladium is partially replaced by other precious metal selected from platinum, ruthenium, and combinations thereof.

5. The electro-plating activator of claim 1 wherein said palladium amounts to less than 0.5 weight percent and said element is selected from about 1.5 weight percent zinc, about 0.9 weight percent silicon and another one of said elements, wherein all said weights are with respect to the weight of said silver.

6. The electro-plating activator of claim 5 wherein said another one of said elements is selected from iron, nickel, zironium, niobium, tin, antimony and manganese.

7. The electro-plating activator of claim 1 wherein said element at least consists of a base metal selected from copper, zinc and silicon.

* * * * *